(12) United States Patent
Deppe

(10) Patent No.: US 6,850,211 B2
(45) Date of Patent: Feb. 1, 2005

(54) METHOD FOR ALIGNING A LENS TRAIN ASSEMBLY WITHIN A HEAD-UP DISPLAY UNIT

(76) Inventor: James Deppe, 1205 Banbury Cir., Naperville, IL (US) 60540

( * ) Notice: Subject to any disclaimer, the term of this patent is extended or adjusted under 35 U.S.C. 154(b) by 47 days.

(21) Appl. No.: 09/683,006

(22) Filed: Nov. 8, 2001

(65) Prior Publication Data

US 2003/0085909 A1 May 8, 2003

(51) Int. Cl.$^7$ ............................................. H04N 5/33
(52) U.S. Cl. .......................... 345/7; 345/8; 345/10; 345/11; 345/13; 345/14
(58) Field of Search ........................... 345/7, 8, 10, 11, 345/13, 14

(56) References Cited

U.S. PATENT DOCUMENTS

| | | | |
|---|---|---|---|
| 3,205,303 A | 9/1965 | Bradley | |
| 3,291,906 A | 12/1966 | Ward et al. | |
| 3,666,887 A | 5/1972 | Freeman | |
| 4,647,967 A | 3/1987 | Kirschner et al. | |
| 4,655,540 A | 4/1987 | Wood et al. | |
| 4,669,810 A | 6/1987 | Wood | |
| 4,763,990 A | 8/1988 | Wood | |
| 4,775,218 A | 10/1988 | Wood et al. | |
| 4,868,652 A | 9/1989 | Nutton | |
| 5,007,711 A | 4/1991 | Wood et al. | |
| 5,134,520 A | 7/1992 | Yamamura | |
| 5,204,666 A | 4/1993 | Aoki et al. | |
| 5,313,292 A | 5/1994 | Wood et al. | |
| 5,381,267 A | 1/1995 | Woody | |
| 5,394,203 A | 2/1995 | Murphy et al. | |
| 5,453,854 A | 9/1995 | Gerbe | |
| 5,479,294 A | 12/1995 | Darrieux et al. | |
| 5,710,668 A | 1/1998 | Gohman et al. | |
| 5,805,119 A | 9/1998 | Erskine et al. | |
| 6,072,444 A | 6/2000 | Burns | |
| 6,107,943 A | 8/2000 | Schroeder | |
| 6,381,072 B1 * | 4/2002 | Burger | 359/622 |

* cited by examiner

Primary Examiner—Bipin Shalwala
Assistant Examiner—Vincent E. Kovalick

(57) ABSTRACT

A method of compensating for distortion errors within a head-up display by mapping default pixel locations within a control environment, storing the default pixel locations to a storing means, recalling the stored default pixel locations while the head-up display is operational, and adjusting the head-up display unit to achieve the default pixel locations.

8 Claims, 1 Drawing Sheet

METHOD FOR ALIGNING A LENS TRAIN ASSEMBLY WITHIN A HEAD-UP DISPLAY UNIT

CROSS REFERENCE TO RELATED APPLICATIONS

The present invention is related to my copending patent application Ser. No. 09/683,005, filed Nov. 8, 2001 and Ser. No. 09/683,009, filed Nov. 8, 2001, both of which are commonly assigned as the present invention and are incorporated herein by reference.

BACKGROUND OF INVENTION

The present invention relates generally to the alignment of visual elements within a conventional head-up display. More specifically, the present invention relates to a method of assigning individual head-up display lens train assembly correction data which further enables ease of interchangeability of the head-up display, enhances viewing accuracy and improves alignment efficiencies.

Ever since the early days of vehicle pioneering, there has always been an inherent danger when an operator of a vehicle, such as a pilot of an aircraft or driver of an automobile, must look down from his outward line of site to view important operative status concerning his vehicle. Such status information is normally presented via analog means such as dials, gauges, or gyroscopes, or digital means such as computer readouts, on a readout display, such as an automobile dashboard or pilot's information panel. The operative status may include information such as fuel, speed, direction, orientation, weapons status, and the like.

As such, when the vehicle operator temporarily looks to the vehicle information display to gather this important information, his outward line of sight is momentarily disrupted. This has inherent dangers, especially in fast moving vehicles such as aircraft and the like. Furthermore, once a vehicle operator is finished gathering the pertinent information, which may take a fraction of a second or sometimes minutes, he must then return to his original line of sight and his focus must readjust. These continual visual diversions relates to problems such as tunnel vision and focus impairment.

It should be noted, however, that the disclosure herein will concentrate on aircraft head-up display devices and enhancements. However, the present invention is applicable to not only aircraft, but also any type of vehicle which may incorporate the usage of a head-up display. As such, the description and emphasis of the present invention's usability within an aircraft should not be deemed limiting, but rather an explanation and exemplification of the present invention.

U.S. Pat. No. 3,205,303, to Bradley, issued on Sep. 7, 1965 ('303 patent) attempts to remedy these problems by inventing a remotely controlled remote viewing system. The '303 patent is one of the first so-called "head-up display" (HUD) units which allows a vehicle operator to receive pertinent vehicle information within his outward line of sight. As such, the vehicle operator does not have to continuously look down to the information display panel to view this information.

There have subsequently been many enhancements and improvements to the '303 patent. For example, U.S. Pat. No. 3,291,906 to Ward et al., issued on Dec. 13, 1996, discloses aircraft visual indicating or display systems utilizing a cathode ray tube; U.S. Pat. No. 3,666,887, to Freeman, issued on May 30, 1972, discloses a head-up display; U.S. Pat. No. 4,763,990, to Wood, issued on Aug. 16, 1988, discloses a head-up display system; U.S. Pat. No. 5,007,711, to Wood et al., issued on Apr. 16, 1991, discloses a compact arrangement for head-up display components; U.S. Pat. No. 5,805,119, to Erskine et al., issued on Sep. 8, 1998, discloses a vehicle projected display using a deformable mirror device; and U.S. Pat. No. 5,379,132, to Kuwayama et al., issued on Jan. 3, 1995, discloses a display apparatus for a head-up display system.

The HUD has subsequently become an important component of the instrumentation in high performance aircraft of all types, from tactical fighter aircraft to large commercial transports. By projecting into the pilot's view an accurate and properly aligned real-time representation of the aircraft's orientation and environment, the pilot is enabled to control an aircraft more efficiently and effectively through the transition from visual orientation to instrument orientation and back again, while having at all times an accurate representation, either digital, analog or both, of all major flight instruments and weapons systems controls.

However, inherent with the pertinent information that a HUD displays, a clear, accurate, and precise information projection to the pilot is tantamount. Continuous and accurate alignment of the visualization elements within an HUD is imperative in order to make the HUD effective. Visualization errors and distortion cannot be tolerated in these finely tuned assemblies. However, inherent with a HUD's use, constant temperature variations, vibrations, distortion, and initial alignment errors, and the like are omnipresent and methods and processes of combating these problems are continuous.

The main component of any conventional HUD is its optics. The optics is the assembly which conveys and magnifies the information in a viewable display to the pilot. Some HUD assemblies utilize a lens train (assembly of lenses within an optical alignment) of conventional lenses.

Furthermore, because of the previously mentioned need for precise and accurate positioning of information in a HUD, it is thus necessary to correct for distortion of the image caused by the cathode ray tube (CRT) electron beam used in conjunction with the lens train. The form of distortion correction must be able to accommodate both conventional, and most widely used in HUD units, stroke-written display generation (where the CRT electron beam moves to each individual display point to be visualized) and raster display generation (where the CRT electron beam performs a progressive left-right sweep from top to bottom, scanning the entire display anew with each pass).

However, the conventional wave-shaping techniques generating non-linear horizontal and vertical raster sweep signals cannot be used for stroke-written displays. Analog techniques for solving this problem have been devised, and are well known in the field of art. The present invention provides significantly better accuracy than these older analog techniques.

Furthermore, there is a direct need within the aircraft industry to allow components of these HUD systems to be interchangeable. For example, currently if an element of a HUD system fails, it must be replaced and manually realigned on-site. The conventional realignment process is extremely time consuming and very inaccurate. Once a HUD installer believes that the HUD is properly aligned, most distortions and errors subsequently occur during operation of the HUD, such as extreme temperature variations and vibrational loads. As such, it is a back-and-forth process between the pilot and the HUD installer in order to properly perfect the HUD's alignment.

The present invention overcomes the disadvantages and/or shortcomings of known prior HUD alignment and distortion correction methods and apparatus and provides significant improvements thereover.

SUMMARY OF INVENTION

The present invention solves lens and CRT deflection distortion due to alignment errors. The present invention maps pixel grid positioning during the manufacturing process and stores the resultant map information in an individualized lookup table which is unique to each HUD unit. The preferred embodiment of the present invention stores the lookup table information in a non-volatile memory (NVM) means incorporated within each HUD unit. As such, when the completed HUD unit is installed in an aircraft environment, correction information from the unit's individualized lookup table is digitally applied by subsequently adjusting the current in the CRT deflection coils, thus resulting with an electron beam deflection which is properly corrected for distortion related to that specific lens train assemblage. Furthermore, this information can automatically be continuously checked to ensure an accurate image is displayed.

BRIEF DESCRIPTION OF THE DRAWINGS

The preferred embodiment is herein described in detail with references to the drawing, where appropriate, wherein.

DETAILED DESCRIPTION

Figure 1:
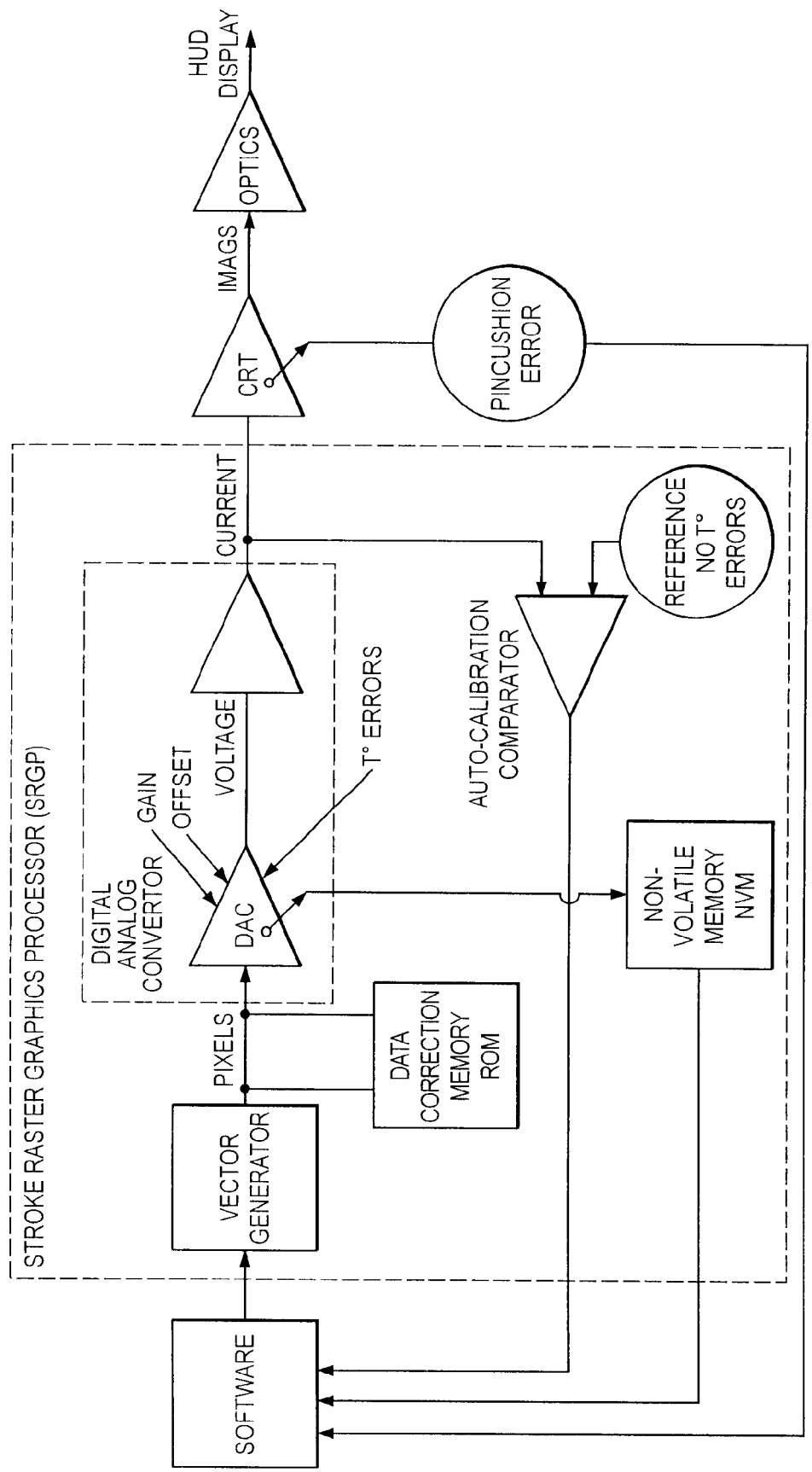
FIG. 1 is a block circuit diagram showing the interaction of the electronic components of the HUD of the present invention.

Conventionally, field distortion correction can be achieved by an on-site analog electronic means by synthesizing distortion correction functions which approximate the ideal correction functions. However, this means of CRT distortion calibration is not sufficiently accurate or repeatable to achieve the high degree of accuracy required for aircraft head-up display applications and is also quite difficult and time consuming to adjust during manufacturing. More and better correction information is needed to ensure that the CRT electron beam is actually aimed at all times in a way that creates an accurate CRT image on which the pilot can rely.

According to the present invention, the preferred embodiment maps a controlled CRT field of display pixel positions from 0 to 4095 in both X and Y-axes during the manufacturing process of the lens train assembly by projecting a controlled electron beam through the lens train assembly upon a display screen. This, in turn, creates a lookup table, which is unique and distinct for each individual HUD optic assembly unit.

This lookup table can then be recorded within a storing means. The preferred embodiment of the present invention utilizes a non-volatile memory (NVM) device connected to the optic assembly unit to store the pixel alignment lookup table.

Alternatively, the lookup table can be stored in a central storage system, can be uploaded to a field storing device, and the like.

To reduce memory requirements, the preferred embodiment of the present invention measures each group of sixteen pixels as one, which reduces the number of actual lookup points to 1024×1024. This process symbolizes regions of 4×4 (16) pixels each.

To create the lookup table information, the preferred embodiment runs the CRT electron beam through a test pattern of any number of measurement points, preferably from 25 to 100. Alternatively, any number of measurement points which produces an assured average of alignment effectiveness will be sufficient, up to and including each individual pixel location. The preferred embodiment subsequently measures the amount of alignment correction which is needed at each measurement point. The correction data is then interpolated between adjacent measurement points to arrive at the ideal alignment correction coefficient required for each of the 1024×1024 regions. This alignment correction data is subsequently recorded via the aforementioned storing means.

When the completed unit is installed in an aircraft environment, the alignment correction information from the unit's individualized lookup table is digitally uploaded to the HUD system. The preferred embodiment adjusts the current in the CRT deflection coils, whereas the resultant beam is properly aligned for distortion at each 4×4 pixel region of the screen based upon the control CRT electron beam measurements. As such, field alignment verification and manipulation is minimized.

Another benefit of the preferred embodiment is that non-symmetric distortion may be further accommodated without added complications. Therefore, it is possible to utilize optics with tilted and de-centered elements in the design of compact, wide field of view HUDS, which, without the benefits of the preferred embodiment of the present invention, would likely have distortion errors of such magnitude as to make the unit unacceptable for aircraft use.

Yet another benefit of the preferred embodiment is that one Pilot Display Unit (PDU) can be freely exchanged for another without affecting the alignment calibration of the system since each PDU has its own individualized correction lookup table associated therewith, wherein the correction information is stored in preferably attached nonvolatile memory.

The foregoing specification describes only the preferred and alternate embodiments of the invention as shown. Other embodiments besides the above may be articulated as well. The terms and expressions therefore serve only to describe the invention by example only and not to limit the invention. It is expected that others will perceive differences, which while differing from the foregoing, do not depart from the spirit and scope of the invention herein described and claimed.

What is claimed is:

1. A method of aligning a lens train assembly within a head-up display unit, said lens train assembly having a plurality of lenses, comprising the steps of:

connecting said lens train assembly to a cathode ray tube, said cathode ray tube having a display screen;

projecting a controlled electron beam through said lens train assembly whereby projecting a display upon said display screen;

mapping the field of display pixels within said display screen using set mapping coordinates whereby creating alignment correction information;

interpolating said alignment correction information between said display pixels whereby obtaining alignment mapping information for each individual display pixel location;

storing said alignment correction information in a storing means;

installing said head-up-display unit;

recalling said alignment correction information from said storing means; and aligning said head-up display unit based upon said alignment correction information with an alignment means.

2. A method as claimed in claim 1 wherein said field of display pixels consists of each individual display pixel.

3. A method as claimed in claim 1 wherein said field of display pixels consists of singular regions of approximately 4×4 display pixels each defining a square whereby the total set of regions is approximately 1024×1024.

4. A method as claimed in claim 1 wherein said mapping coordinates consists of a sample of approximately 25 to 100 field of display pixels.

5. A method as claimed in claim 1 wherein said storing means consists of nonvolatile memory.

6. A method as claimed in claim 5 wherein said nonvolatile memory is fixedly attached to said lens train assembly.

7. A method as claimed in claim 1 wherein said storing means consists of a central storage location.

8. A method as claimed in claim 1 where said alignment means consists of adjusting the cathode ray tube deflection coil current.

\* \* \* \* \*